US012211634B2

(12) United States Patent
Harada et al.

(10) Patent No.: US 12,211,634 B2
(45) Date of Patent: Jan. 28, 2025

(54) SOFT MAGNETIC ALLOY AND MAGNETIC COMPONENT

(71) Applicant: TDK CORPORATION, Tokyo (JP)

(72) Inventors: Akihiro Harada, Tokyo (JP); Akito Hasegawa, Tokyo (JP); Kazuhiro Yoshidome, Tokyo (JP); Kenji Horino, Tokyo (JP); Hiroyuki Matsumoto, Tokyo (JP)

(73) Assignee: TDK CORPORATION, Tokyo (JP)

( * ) Notice: Subject to any disclaimer, the term of this patent is extended or adjusted under 35 U.S.C. 154(b) by 14 days.

(21) Appl. No.: 16/765,915

(22) PCT Filed: Aug. 21, 2018

(86) PCT No.: PCT/JP2018/030731

§ 371 (c)(1),
(2) Date: May 21, 2020

(87) PCT Pub. No.: WO2019/102666

PCT Pub. Date: May 31, 2019

(65) Prior Publication Data

US 2020/0357546 A1 Nov. 12, 2020

(30) Foreign Application Priority Data

Nov. 21, 2017 (JP) ................................ 2017-223780

(51) Int. Cl.

| | |
|---|---|
| ***H01F 1/153*** | (2006.01) |
| ***C22C 38/02*** | (2006.01) |
| ***C22C 38/16*** | (2006.01) |
| ***C22C 45/02*** | (2006.01) |

(52) U.S. Cl.

CPC ......... *H01F 1/15308* (2013.01); *C22C 38/02* (2013.01); *C22C 38/16* (2013.01); *C22C 45/02* (2013.01); *C22C 2202/02* (2013.01)

(58) Field of Classification Search

None

See application file for complete search history.

(56) References Cited

U.S. PATENT DOCUMENTS

| | | | | |
|---|---|---|---|---|
| 2009/0065100 | A1* | 3/2009 | Yoshizawa | C22C 45/02 148/403 |
| 2010/0108196 | A1* | 5/2010 | Ohta | C22C 38/002 148/121 |
| 2012/0318412 | A1 | 12/2012 | Ohta et al. | |
| 2020/0357547 | A1* | 11/2020 | Harada | H01F 1/14716 |

FOREIGN PATENT DOCUMENTS

| | | | | |
|---|---|---|---|---|
| JP | 2011-149045 | A | 8/2011 | |
| JP | 2012-012699 | A | 1/2012 | |
| WO | WO-2008133301 | A1 * | 11/2008 | C21D 6/00 |
| WO | 2011/122589 | A1 | 10/2011 | |

OTHER PUBLICATIONS

Machine translation of WO 2008/133301A1. (Year: 2008).*

Oct. 16, 2018 International Search Report issued in International Patent Application No. PCT/JP2018/030731.

May 26, 2020 International Preliminary Report on Patentability issued in International Patent Application No. PCT/JP2018/030731.

* cited by examiner

*Primary Examiner* — Xiaowei Su

(74) *Attorney, Agent, or Firm* — Oliff PLC

(57) ABSTRACT

A soft magnetic alloy or the like combines high saturated magnetic flux density, low coercive force and high magnetic permeability μ'. A soft magnetic alloy having the composition formula $(Fe_{(1-(\alpha+\beta))}X1_{\alpha}X2_{\beta})_{(1-(a+b+c+d+e))}B_aSi_bC_cCu_dM_e$. X1 is one or more elements selected from the group consisting of Co and Ni, X2 is one or more elements selected from the group consisting of Al, Mn, Ag, Zn, Sn, As, Sb, Bi, N, O and rare earth elements, and M is one or more elements selected from the group consisting of Nb, Hf, Zr, Ta, Ti, Mo, μ' and V. $0.090 \leq a \leq 0.240$, 0.030.

12 Claims, No Drawings

SOFT MAGNETIC ALLOY AND MAGNETIC COMPONENT

TECHNICAL FIELD

The present invention relates to a soft magnetic alloy and a magnetic component.

BACKGROUND

Recently, electronic devices, information devices, and communication devices are demanded to have a lower power consumption and a higher efficiency. Further, in order to achieve a low carbon society, the above-mentioned demands are higher. Therefore, a power circuit of the electronic devices, information devices, and communication devices is demanded to reduce the energy loss and to improve a power source efficiency. Therefore, a magnetic core of the magnetic element used in the power source circuit is demanded to improve a saturation magnetic flux density, to reduce a core loss, and to improve a permeability. By reducing the core loss, the electric power energy loss is decreased; and by improving the saturation magnetic density and the permeability, the magnetic element can be more compact thus a higher efficiency and a lower energy consumption can be attained. As a method for reducing the core loss of the magnetic core, a method of reducing a coercive force of the magnetic body constituting the magnetic core may be mentioned.

Also, as a soft magnetic alloy included in the magnetic core of the magnetic element, a Fe-based soft magnetic alloy is used. The Fe-based magnetic alloy is demanded to have good magnetic properties (a high saturation magnetic flux density, a low coercive force, and a high permeability).

Patent Document 1 discloses an invention related to a Fe-based soft magnetic alloy composition having amorphous structure and including Fe, B, Si, P, C, and Cu.

[Patent Document 1] JP Patent Application Laid Open No. 2012-12699

SUMMARY

An object of the present invention is to provide a soft magnetic alloy and the like which simultaneously satisfies a high saturation magnetic flux density, a low coercive force, and a high permeability μ'.

A soft magnetic alloy according to one aspect is a soft magnetic alloy including a component represented by a compositional formula $(Fe_{(1-(\alpha+\beta))}X1_{\alpha}X2_{\beta})_{(1-(a+b+c+d+e))}B_{a}Si_{b}C_{c}Cu_{d}M_{e}$, in which X1 is one or more selected from Co and Ni, X2 is one or more selected from Al, Mn, Ag, Zn, Sn, As, Sb, Bi, N, O, and rare earth elements, M is one or more selected from Nb, Hf, Zr, Ta, Ti, Mo, W, and V, $0.090 \le a \le 0.240$, $0.030 < b < 0.080$, $0 < c < 0.040$, $0 < d \le 0.020$, $0 \le e \le 0.030$, $\alpha \ge 0$, $\beta \ge 0$, and $0 \le \alpha+\beta \le 0.50$ are satisfied.

By having such characteristics, the soft magnetic alloy according to the present invention tends to attain a structure which tends to easily form a Fe-based nanocrystal alloy by carrying out a heat treatment. Further, the Fe-based nanocrystal alloy having the above-mentioned characteristics becomes a soft magnetic alloy which simultaneously satisfies a high saturation magnetic flux density, a low coercive force, and a high permeability μ'.

The soft magnetic alloy according to the present invention may satisfy $0 \le \alpha\{1-(a+b+c+d+e)\} \le 0.40$.

The soft magnetic alloy according to the present invention may satisfy a=0.

The soft magnetic alloy according to the present invention may satisfy $0 \le \beta\{1-(a+b+c+d+e)\} \le 0.030$.

The soft magnetic alloy according to the present invention may satisfy $\beta=0$.

The soft magnetic alloy according to the present invention may satisfy $\alpha=\beta 0$.

The soft magnetic alloy according to the present embodiment may include an amorphous and an initial fine crystal, and the soft magnetic alloy may have a nano-hetero structure in which the initial fine crystal is in the amorphous.

The soft magnetic alloy according to the present invention may have an average grain size of the initial fine crystal of 0.3 to 10 nm.

The soft magnetic alloy according to the present invention may have a structure made of a Fe-based nanocrystal.

The soft magnetic alloy according to the present embodiment may have an average grain size of the Fe-based nanocrystal of 5 to 30 nm.

The soft magnetic alloy according to the present invention may be a thin ribbon form.

The soft magnetic alloy according to the present invention may be a powder form.

A magnetic component according to the present invention includes the above mentioned soft magnetic alloy.

DETAILED DESCRIPTION

Hereinafter, an embodiment of the present invention is described.

The soft magnetic alloy according to the present embodiment includes a component represented by a compositional formula) $(Fe_{(1-(\alpha+\beta))}X1_{\alpha}X2_{\beta})_{(1-(a+b+c+d+e))}B_{a}Si_{b}C_{c}Cu_{d}M_{e}$, in which X1 is one or more selected from Co and Ni, X2 is one or more selected from Al, Mn, Ag, Zn, Sn, As, Sb, Bi, N, O, and rare earth elements, M is one or more selected from Nb, Hf, Zr, Ta, Ti, Mo, W, and V, $0.090 \le a \le 0.240$, $0.030 < b < 0.080$, $0 < c < 0.040$, $0 < d \le 0.020$, $0 \le e \le 0.030$, $\alpha \ge 0$, $\beta \ge 0$, and $0 \le \alpha+\beta \le 0.50$ are satisfied.

The soft magnetic alloy having the above composition tends to easily become a soft magnetic alloy made of an amorphous and not including crystal phases made of crystals having a grain size larger than 30 nm. Further, in case of heat treating the soft magnetic alloy, a Fe-based nanocrystal tends to easily precipitate. Also, the soft magnetic alloy including the Fe-based nanocrystal tends to attain good magnetic properties.

In other words, the soft magnetic alloy having the above-mentioned composition tends to be a starting material of the soft magnetic alloy in which a Fe-based nanocrystal is precipitated.

The Fe-based nanocrystal refers to a crystal of which the grain size is nano order and a crystal structure of Fe is bcc (body center cubic structure). In the present embodiment, it is preferable to precipitate a Fe-based nanocrystal having an average grain size of 5 to 30 nm. The soft magnetic alloy in which such Fe-based nanocrystal is precipitated tends to attain a high saturation magnetic flux density, a low coercive force, and a high permeability W. Note that, a permeability μ' is a real part of a complex permeability.

Note that, the soft magnetic alloy before the heat treatment may be solely consisted by an amorphous, however, the soft magnetic alloy before the heat treatment preferably includes an amorphous and an initial fine crystal having a grain size of 15 nm or less, and also preferably the soft magnetic alloy has a nano-hetero structure in which the initial fine crystal is in the amorphous. By having the nano-hetero structure in which the initial fine crystal is in the amorphous, the Fe-based nanocrystal tends to easily precipitate during the heat treatment. Note that, in the present embodiment, the initial fine crystal preferably has an average grain size of 0.3 to 10 nm.

Hereinafter, each component of the soft magnetic alloy according to the present embodiment is described.

B content (a) is $0.090 \le a \le 0.240$. It is preferably $0.120 \le a \le 0.220$. By satisfying $0.120 \le a \le 0.220$, particularly the coercive force tends to easily decrease and the permeability μ' tends to easily increase. In case a is too small or too large, the crystal phases made of a crystal having an average grain size larger than 30 nm tends to be easily formed in the soft magnetic alloy before the heat treatment. When the crystal phases are formed, the Fe-based nanocrystal cannot be precipitated by the heat treatment, and the coercive force tends to increase easily and the permeability μ' tends to decrease easily. Further, in case a is too large, the saturation magnetic flux density tends to decrease easily.

Si content (b) is $0.030 < b < 0.08$. It is preferably $0.032 \le b \le 0.078$, and more preferably $0.040 \le b \le 0.070$. By satisfying $0.040 \le b \le 0.070$, particularly the coercive force tends to easily decrease and the permeability μ' tends to easily increase. If b is too large, the saturation magnetic flux density tends to decrease easily. In case b is too small, the coercive force tends to become higher easily, and the permeability μ' tends become lower easily.

C content (c) is $0 < c < 0.040$. It may preferably be $0.001 \le c \le 0.038$, and more preferably it may be $0.010 \le c \le 0.030$. By satisfying $0.010 \le c \le 0.030$, particularly the coercive force tends to easily decrease and the permeability μ' tends to easily increase. In case c is too large or too small, the coercive force tends to increase easily and the permeability μ' tends to decrease easily.

Cu content (d) is $0 < d < 0.020$. It may preferably be $0.001 \le d \le 0.020$, and more preferably it may be $0.005 \le d \le 0.015$. By satisfying $0.005 \le d \le 0.015$, particularly the coercive force tends to easily decrease and the permeability μ' tends to easily increase. In case d is too large, the crystal phases made of a crystal having an average grain size larger than 30 nm tends to be easily formed in the soft magnetic alloy before the heat treatment. When the crystal phases are formed, the Fe-based nanocrystal cannot be precipitated by the heat treatment, the coercive force tends to increase easily and the permeability μ' tends to decrease easily. In case d is too small, the coercive force tends to increase easily and the permeability μ' tends to decrease easily.

Also, since the soft magnetic alloy according to the present embodiment simultaneously includes C and Cu within the above-mentioned range, the Fe nanocrystal tends to easily stabilize. Thus, the coercive force after the heat treatment tends to easily decrease and also the permeability μ' tends to easily improve.

M is one or more selected from Nb, Hf, Zr, Ta, Ti, Mo, W, and V.

M content (e) is $0 \le e \le 0.030$. It may be e=0, that is M may not be included. In case e is too large, the saturation magnetic flux density tends to decrease easily.

Fe content $(1-(a+b+c+d+e))$ is not particularly limited. It may preferably be $0.680 \le 1-(a+b+c+d+e) \le 0.860$, and more preferably it may be $0.700 \le 1-(a+b+c+d+e) \le 0.800$.

Also, in the soft magnetic alloy according to the present embodiment, part of Fe may be substituted by X1 and/or X2.

X1 is one or more selected from Co and Ni. X1 content may be $\alpha=0$. That is, X1 may not be included. Also, a number of X1 atoms is preferably 40 at % or less when a number of atoms of entire composition is 100 at %. That is, $0 \le \alpha\{1-(a+b+c+d+e)\} \le 0.40$ may be preferably satisfied.

X2 is one or more selected from Al, Mn, Ag, Zn, Sn, As, Sb, Bi, N, O, and rare earth elements. X2 content may be 0=0. That is, X2 may not be included. Also, a number of X2 atoms is preferably 3.0 at % or less when a number of atoms of entire composition is 100 at %. That is, $0 \le \beta\{1-(a+b+c+d+e)\} \le 0.030$ may be preferably satisfied.

As an amount of X1 and/or X2 substituting Fe may be within a range of half or less of Fe in terms of number of Fe atoms. That is, $0 \le \alpha+\beta \le 0.50$. In case of $\alpha+\beta > 0.50$, it becomes difficult to form the Fe-based nanocrystal alloy by a heat treatment.

Note that, the soft magnetic alloy according to the present embodiment may include elements other than the above-mentioned elements as inevitable impurities. For example, the inevitable impurities may be included by 1 wt % or less with respect to 100 wt % of the soft magnetic alloy. Particularly, in case of including P, residues derived from P tends to easily adhere to a melting furnace wall while melting raw material metals, and the melting furnace tends to be easily damaged. Further, magnetic properties of the obtained soft magnetic alloy tend to change significantly over the time. Therefore, preferably P is substantially not included. By referring "substantially not included", P content is 0.1 wt % or less with respect to 100 wt % of the soft magnetic alloy.

Hereinafter, a method for producing the soft magnetic alloy according to the present embodiment is described.

The method for producing the soft magnetic alloy according to the present embodiment is not particularly limited. For example, a method of producing a thin ribbon of soft magnetic alloy according to the present embodiment by a single roll method may be mentioned. Also, the thin ribbon may be a continuous thin ribbon.

In a single roll method, first, a pure metal of each metal element included in the soft magnetic alloy obtained at the end is prepared. Then, it is weighed so that a same composition as the soft magnetic alloy obtained at the end is obtained. Then, the pure metal of each element is melted and mixed to produce a mother alloy. Note that, a method of melting the pure metal is not particularly limited. For example, a method of melting by a high frequency heat after vacuuming the chamber may be mentioned. Note that, the mother alloy and the soft magnetic alloy made of the Fe-based nanocrystal obtained at the end has the same composition.

Next, the produced mother alloy is heated and melted to produce a molten metal. A temperature of the molten metal is not particularly limited, and it can be 1200 to 1500° C.

In a single roll method, a thickness of the thin ribbon can be regulated mainly by adjusting a rotational speed of the roll. Also, for example, a thickness of the thin ribbon can also be regulated by adjusting a space between a nozzle and a roll; and also by adjusting a temperature of the molten metal. The thickness of the thin ribbon is not particularly limited, and for example it can be 5 to 30 μm.

At the time before the heat treatment which is described in below, the thin ribbon is an amorphous which does not include a crystal having a grain size larger than 30 nm. By carrying out the heat treatment to the thin ribbon which is an amorphous, the Fe-based nanocrystal alloy can be obtained.

Note that, a method of verifying whether the thin ribbon of the soft magnetic alloy before the heat treatment includes a crystal having a grain size larger than 30 nm is not particularly limited. For example, the presence of the crystal having a grain size larger than 30 nm can be verified by usual X ray diffraction analysis.

Also, the thin ribbon before the heat treatment may be completely free of the initial fine crystal having a grain size of 15 nm or less, however the initial fine crystal is preferably included. That is, the thin ribbon before the heat treatment preferably has a nano-hetero structure made of the amorphous and the initial fine crystal which is in the amorphous. Note that, the grain size of the initial fine crystal is not particularly limited, and an average grain size may preferably be 0.3 to 10 nm.

Also, a method for observing the presence of the above-mentioned initial fine crystal and the average grain size of the initial fine crystal is not particularly limited. For example, the presence of the above-mentioned initial fine crystal and the average grain size of the initial fine crystal can be verified by obtaining a selected area diffraction pattern, a nano beam diffraction pattern, a bright field image, or a high resolution image using a transmission electron microscope to a sample which is thinned by an ion milling. In case of using a selected area diffraction pattern and a nano beam diffraction pattern, in regards with the diffraction pattern, the amorphous forms a ring shape pattern, and non-amorphous forms a diffraction pattern of a diffraction dots which is derived from the crystal structure. Also, in case of using a bright field image or a high-resolution image, the presence of the initial fine crystal and the average grain size of the initial fine crystal can be observed by visual observation under a magnification of $1.00\times10^5$ to $3.00\times10^5$.

A temperature of roll, a rotational speed, and an atmosphere inside a chamber are not particularly limited. The temperature of the roll is preferably 4 to 30° C. to form an amorphous. As the rotational speed of the roll becomes faster, the average grain size of the initial fine crystal tends to decrease, and it is preferably 30 to 40 m/sec in order to obtain the initial fine crystal having an average grain size of 0.3 to 10 nm. The atmosphere inside the chamber is preferably in air from the point of cost.

Also, a heat treatment condition for producing the Fe-based nanocrystal alloy is not particularly limited. A preferable heat treatment condition differs depending on the composition of the soft magnetic alloy. Usually, the preferable heat treatment condition is about 425 to 475° C., and a preferable heat treatment time is about 5 to 120 minutes. However, the preferable heat treatment temperature and time may be found outside the above-mentioned range depending on the composition. Also, the atmosphere during the heat treatment is not particularly limited. It may be carried out under active atmosphere such as in air, or it may be carried out under inert atmosphere such as in Ar gas or so.

Also, a method of calculating the average grain size of the obtained Fe-based nanocrystal alloy is not particularly limited. For example, the average grain size can be calculated using a transmission electron microscope. Also, a method of verifying bcc (body center cubic structure) of the crystal structure is not particularly limited. For example, the crystal structure can be confirmed using X ray diffraction analysis.

As a method of obtaining the soft magnetic alloy according to the present embodiment, other than the above-mentioned single roll method, for example, a method of obtaining a powder of the soft magnetic alloy according to the present embodiment by a water atomization method, a gas atomization method may be mentioned. Hereinafter, a gas atomization method is described.

In a gas atomization method, a molten metal of temperature range of 1200 to 1500° C. is obtained as same as a single roll method. Then, the molten metal is injected in a chamber, thereby a powder is produced.

Here, by setting a gas injecting temperature to 4 to 30° C. and setting a vapor pressure inside the chamber to 1 hPa or less, the above-mentioned preferable nano-hetero structure tends to be obtained easily.

After producing the powder by a gas atomization method, a heat treatment at 400 to 600° C. for 0.5 to 5 minutes is carried out. Thereby, the element diffusion is facilitated, while the powder is restricted from sintering with each other and becoming too large, and the powder can reach to a thermodynamic equilibrium in short period of time. Thereby, strain and stress can be removed, and the Fe-based soft magnetic alloy having the average grain size of 10 to 50 nm tends to be easily formed.

Hereinabove, an embodiment of the present invention is described, however the present invention is not limited thereto.

The shape of the soft magnetic alloy according to the present embodiment is not particularly limited. As described in above, a thin ribbon form and a powder form are mentioned as examples, however, other than these, a block shape and the like may be mentioned.

The use of the soft magnetic alloy (Fe-based nanocrystal alloy) according to the present embodiment is not particularly limited. For example, magnetic components may be mentioned, and among these, a magnetic core may be mentioned. It can be suitably used as a magnetic core for inductor, particularly for a power inductor. The soft magnetic alloy according to the present embodiment can be suitably used for a thin film inductor, a magnetic head, and the like other than the magnetic core.

Hereinafter, a method of obtaining a magnetic component, particularly a magnetic core and an inductor from the soft magnetic alloy according to the present embodiment is described. However, the method of obtaining the magnetic core and the inductor from the soft magnetic alloy according to the present embodiment is not particularly limited thereto. Also, as the use of the magnetic core, other than the inductor, a transformer, a motor, and the like may be mentioned.

As a method of obtaining the magnetic core from the soft magnetic alloy of a thin ribbon form, for example, a method of winding the soft magnetic alloy of a thin ribbon form and a method of stacking the soft magnetic alloy of a thin ribbon form may be mentioned. In case of stacking an insulator between the soft magnetic alloys of a thin ribbon form, the magnetic core with even enhanced properties can be obtained.

As a method of obtaining the magnetic core from a powder form soft magnetic alloy, for example, a method of molding using a metal mold after mixing the soft magnetic alloy of a powder form with a binder may be mentioned. Also, before mixing with the binder, by performing an oxidizing treatment, an insulation coating, and the like to the powder surface, a resistivity improves and the magnetic core suited for even higher frequency range can be obtained.

A method of molding is not particularly limited, and for example, a method of molding using a metal mold, a mold pressing, and the like may be mentioned. A type of the binder is not particularly limited, and a silicone resin may be mentioned. A mixing ratio between the soft magnetic alloy powder and the binder is not particularly limited. For example, 1 to 10 mass % of the binder may be mixed with respect to 100 mass % of the soft magnetic alloy powder.

For example, 1 to 5 mass % of the binder is mixed with 100 mass % of the soft magnetic alloy powder, then press molding is performed using a metal mold. Thereby, the magnetic core having 70% or more of a space factor (a powder filling rate), 0.45 T or more of a magnetic flux density when $1.6\times10^4$ A/m of magnetic field is applied, and 1 Ω·cm or more of a resistivity can be obtained. The above-mentioned properties are same or better than a generally known ferrite magnetic core.

Also, for example, 1 to 3 mass % of the binder is mixed with 100 mass % of the soft magnetic alloy. Then, press molding is performed at a temperature higher than the softening point of the binder using a metal mold. Thereby, a dust core having 80% or more of a space factor, 0.9 T or more of a magnetic flux density when $1.6\times10^4$ A/m of magnetic field is applied, and 0.1 Ω·cm or more of a resistivity can be obtained. The above-mentioned properties are better than a generally known dust core.

Further, by performing a heat treatment as a strain relief heat treatment after molding is done to a molded article which forms the above-mentioned magnetic core, a core loss is further decreased and a functionality is increased. Note that, the core loss of the magnetic core decreases as the coercive force of the magnetic body constituting the magnetic core decreases.

Also, an inductor component can be obtained by winding a wire around the magnetic core. A method of winding the wire around the core is not particularly limited, and also a method of producing the inductor component is not particularly limited. For example, a method of winding the wire for at least one turn around the magnetic core produced by the above-mentioned method may be mentioned.

Further, in case of using the soft magnetic alloy particle, there is a method of producing an inductor component by press molding the magnetic body while the wound coil is incorporated in the magnetic body. In such case, an inductor component which corresponds to high frequency range and large electric current tends to be easily obtained.

Further, in case of using the soft magnetic alloy particle, the inductor component can be obtained by print stacking a soft magnetic alloy paste and a conductor paste in an alternating manner and then firing may be carried out. The soft magnetic alloy paste is obtained by forming a paste by adding the binder and the solvent to the soft magnetic alloy particle. The conductor paste is obtained by forming a paste by adding the binder and the solvent to a conductor metal for coil. Alternatively, a soft magnetic alloy sheet is produced using the soft magnetic alloy paste, and a conductor paste is printed to the surface of the soft magnetic alloy sheet, then these are stacked and fired. Thereby, the inductor component in which a coil is incorporated in the magnetic body can be obtained.

Here, in case of producing the inductor component using the soft magnetic alloy particle, from the point of obtaining excellent Q property, it is preferable to use a soft magnetic alloy powder having a maximum grain size by a sieve gauge of 45 μm or less, and a median grain size (D50) of 30 μm or less. In order to have the maximum grain size by a sieve gauge of 45 μm or less, a sieve having a gauge of 45 μm is used, and the soft magnetic alloy powder which passed through the sieve may be only used.

As the soft magnetic alloy powder having large maximum grain size is used more, the Q value under high frequency range tends to decrease. In case the soft magnetic alloy powder having a maximum grain size larger than 45 μm by a sieve gauge is used, the Q value under high frequency range may decrease significantly. Note that, in case the Q value under a high frequency range is not important factor, then the soft magnetic alloy powder having various sizes can be used. Thus, the soft magnetic alloy having various sizes can be produced at relatively low cost. Thus, in case of using the soft magnetic alloy having various sizes, a cost can be reduced.

EXAMPLES

Hereinafter, the present invention is described based on examples.

Raw material metals were weighed to obtain an alloy composition of Examples and Comparative examples shown in below Tables, then the raw material metals were melted by high frequency heating, thereby a mother alloy was produced.

Then, the produced mother alloy was heated and melted to form a molten metal of 1300° C., then the molten metal was injected on a roll of 20° C. in air rotating at a rotational speed of 40 m/sec by a single roll method. Thereby, a thin ribbon was formed. A thickness of the thin ribbon was 20 to 25 μm, a width of thin ribbon was about 15 mm, and a length of thin ribbon was about 10 m.

The obtained thin ribbon was subjected to X ray diffraction analysis, and a crystal having a grain size larger than 30 nm was verified. In case the crystal having the grain size larger than 30 nm was not found, it was considered that the thin ribbon was made of amorphous phases; and in case the crystal having grain size larger than 30 nm was found, then it was considered that the thin ribbon was made of crystal phases. Note that, in the amorphous phases, an initial fine crystal having a grain size of 15 nm or less may be included.

Then, to the thin ribbon of Examples and Comparative examples, a heat treatment was performed under the condition shown in below Tables. Note that, for samples without a heat treatment temperature in below Tables, the heat treatment temperature was 450° C. Each thin ribbon after the heat treatment was measured with a coercive force, a saturation magnetic flux density, and a permeability μ'. The coercive force (Hc) was measured using a DC BH tracer at a magnetic field of 5 kA/m. The saturation magnetic flux density (Bs) was measured using a Vibrating Sample Magnetometer (VSM) at a magnetic field of 1000 kA/m. The permeability (μ') was measured using an impedance analyzer at a frequency of 1 kHz. In the present examples, the coercive force of 5.0 A/m or less was considered good, and 3.0 A/m or less was considered even better. The saturation magnetic flux density of 1.50 T or more was considered good. The permeability μ' of 30000 or more was considered good, and 40000 or more was considered even better.

Note that, in below shown Examples, unless mentioned otherwise, all Examples were confirmed to have Fe-based nanocrystal having an average grain size of 5 to 30 nm, and a crystal structure of bcc was confirmed by observation using X ray diffraction analysis and transmission electron microscope.

TABLE 1

| Sample No. | $Fe_{(1-(a+b+c+d))}B_aSi_bC_cCu_d$ Fe | B a | Si b | C c | Cu d | XRD | Bs (T) | Hc (A/m) | μ' (1 kHz) |
|---|---|---|---|---|---|---|---|---|---|
| Comparative example 1 | 0.670 | ***0.250*** | 0.050 | 0.020 | 0.010 | Crystal phase | ***1.44*** | ***317*** | ***517*** |
| Example 2 | 0.680 | 0.240 | 0.050 | 0.020 | 0.010 | Amorphous phase | 1.50 | 4.8 | 32400 |
| Example 3 | 0.700 | 0.220 | 0.050 | 0.020 | 0.010 | Amorphous phase | 1.51 | 3.0 | 44000 |
| Example 4 | 0.740 | 0.180 | 0.050 | 0.020 | 0.010 | Amorphous phase | 1.55 | 2.7 | 47700 |
| Example 1 | 0.770 | 0.150 | 0.050 | 0.020 | 0.010 | Amorphous phase | 1.61 | 2.4 | 49100 |
| Example 5 | 0.800 | 0.120 | 0.050 | 0.020 | 0.010 | Amorphous phase | 1.69 | 2.6 | 48200 |
| Example 6 | 0.830 | 0.090 | 0.050 | 0.020 | 0.010 | Amorphous phase | 1.71 | 3.3 | 38700 |
| Example 7 | 0.860 | 0.090 | 0.040 | 0.005 | 0.005 | Amorphous phase | 1.77 | 4.3 | 31500 |
| Comparative example 2 | 0.840 | ***0.080*** | 0.050 | 0.020 | 0.010 | Crystal phase | 1.76 | ***214*** | ***688*** |

TABLE 2

| Sample No. | $Fe_{(1-(a+b+c+d))}B_aSi_bC_cCu_d$ Fe | B a | Si b | C c | Cu d | XRD | Bs (T) | He (A/m) | μ' (1 kHz) |
|---|---|---|---|---|---|---|---|---|---|
| Comparative example 3 | 0.740 | 0.150 | ***0.080*** | 0.020 | 0.010 | Amorphous phase | ***1.48*** | 5.0 | 30300 |
| Example 11 | 0.742 | 0.150 | 0.078 | 0.020 | 0.010 | Amorphous phase | 1.54 | 3.2 | 36700 |
| Example 12 | 0.750 | 0.150 | 0.070 | 0.020 | 0.010 | Amorphous phase | 1.62 | 2.2 | 48800 |
| Example 1 | 0.770 | 0.150 | 0.050 | 0.020 | 0.010 | Amorphous phase | 1.61 | 2.4 | 49100 |
| Example 13 | 0.780 | 0.150 | 0.040 | 0.020 | 0.010 | Amorphous phase | 1.64 | 2.9 | 42900 |
| Example 14 | 0.788 | 0.150 | 0.032 | 0.020 | 0.010 | Amorphous phase | 1.68 | 4.1 | 35500 |
| Comparative example 4 | 0.790 | 0.150 | ***0.030*** | 0.020 | 0.010 | Amorphous phase | 1.65 | ***5.8*** | ***22700*** |

TABLE 3

| Sample No. | $Fe_{(1-(a+b+c+d))}B_aSi_bC_cCu_d$ Fe | B a | Si b | C c | Cu d | XRD | Bs (T) | Hc (A/m) | μ' (1 kHz) |
|---|---|---|---|---|---|---|---|---|---|
| Comparative example 5 | 0.750 | 0.150 | 0.050 | ***0.040*** | 0.010 | Amorphous phase | 1.52 | ***6.2*** | ***19700*** |
| Example 21 | 0.752 | 0.150 | 0.050 | 0.038 | 0.010 | Amorphous phase | 1.61 | 3.6 | 31800 |
| Example 22 | 0.760 | 0.150 | 0.050 | 0.030 | 0.010 | Amorphous phase | 1.64 | 2.6 | 45900 |
| Example 1 | 0.770 | 0.150 | 0.050 | 0.020 | 0.010 | Amorphous phase | 1.61 | 2.4 | 49100 |
| Example 23 | 0.780 | 0.150 | 0.050 | 0.010 | 0.010 | Amorphous phase | 1.67 | 2.5 | 47000 |
| Example 7 | 0.860 | 0.090 | 0.040 | 0.005 | 0.005 | Amorphous phase | 1.77 | 4.3 | 31500 |
| Example 24 | 0.789 | 0.150 | 0.050 | 0.001 | 0.010 | Amorphous phase | 1.63 | 4.2 | 33500 |
| Comparative example 6 | 0.790 | 0.150 | 0.050 | ***0.000*** | 0.010 | Amorphous phase | 1.55 | ***5.2*** | ***26700*** |
| Comparative example 7 | 0.800 | 0.150 | 0.050 | ***0.000*** | ***0.000*** | Amorphous phase | 1.60 | ***5.6*** | ***24100*** |

TABLE 4

| Sample No. | $Fe_{(1-(a+b+c+d))}B_aSi_bC_cCu_d$ Fe | B a | Si b | C c | Cu d | XRD | Bs (T) | Hc (A/m) | μ' (1 kHz) |
|---|---|---|---|---|---|---|---|---|---|
| Comparative example 8 | 0.758 | 0.150 | 0.050 | 0.020 | ***0.022*** | Crystal phase | 1.57 | ***283*** | ***552*** |
| Example 31 | 0.760 | 0.150 | 0.050 | 0.020 | 0.020 | Amorphous phase | 1.58 | 3.9 | 31200 |
| Example 32 | 0.765 | 0.150 | 0.050 | 0.020 | 0.015 | Amorphous phase | 1.56 | 2.8 | 46900 |
| Example 1 | 0.770 | 0.150 | 0.050 | 0.020 | 0.010 | Amorphous phase | 1.61 | 2.4 | 49100 |
| Example 33 | 0.775 | 0.150 | 0.050 | 0.020 | 0.005 | Amorphous phase | 1.60 | 2.5 | 48500 |
| Example 34 | 0.779 | 0.150 | 0.050 | 0.020 | 0.001 | Amorphous phase | 1.61 | 4.1 | 30600 |
| Comparative example 9 | 0.780 | 0.150 | 0.050 | 0.020 | ***0.000*** | Amorphous phase | 1.53 | ***5.3*** | ***25200*** |
| Comparative example 7 | 0.800 | 0.150 | 0.050 | ***0.000*** | ***0.000*** | Amorphous phase | 1.60 | ***5.6*** | ***24100*** |

TABLE 5

| Sample No. | $Fe_{(1-(a+b+c+d+e))}B_aSi_bCu_dM_e$ (a to d are same as Example 1) M Type | e | XRD | Bs (T) | Hc (A/m) | μ' (1 kHz) |
|---|---|---|---|---|---|---|
| Example 1 | — | 0.000 | Amorphous phase | 1.61 | 2.4 | 49100 |
| Example 41 | Nb | 0.010 | Amorphous phase | 1.57 | 2.1 | 50300 |
| Example 42 | Nb | 0.030 | Amorphous phase | 1.50 | 1.7 | 52100 |
| Comparative example 10 | Nb | ***0.050*** | Amorphous phase | ***1.44*** | 1.5 | 53000 |
| Example 43 | Hf | 0.010 | Amorphous phase | 1.58 | 2.1 | 50500 |
| Example 44 | Zr | 0.010 | Amorphous phase | 1.57 | 2.0 | 51000 |

TABLE 5-continued

| Sample No. | $Fe_{(1-(a+b+c+d+e))}B_aSi_bCu_dM_e$ (a to d are same as Example 1) M Type | e | XRD | Bs (T) | Hc (A/m) | μ' (1 kHz) |
|---|---|---|---|---|---|---|
| Example 45 | Ta | 0.010 | Amorphous phase | 1.58 | 2.0 | 50800 |
| Example 46 | Ti | 0.010 | Amorphous phase | 1.56 | 2.2 | 49800 |
| Example 47 | Mo | 0.010 | Amorphous phase | 1.57 | 2.1 | 50200 |
| Example 48 | W | 0.010 | Amorphous phase | 1.55 | 2.2 | 49900 |
| Example 49 | V | 0.010 | Amorphous phase | 1.56 | 2.2 | 50100 |

TABLE 6

| Sample No. | $Fe(1-(\alpha + \beta))X1\alpha X2\beta$ (a to e are sane as Example 1) X1 Type | X1 α{1-(a + b + c + d + e)} | X2 Type | X2 β{1-(a + b + c + d + e)} | XRD | Bs (T) | Hc (A/m) | μ' (1 kHz) |
|---|---|---|---|---|---|---|---|---|
| Example 1 | — | 0.000 | — | 0.000 | Amorphous Phase | 1.61 | 2.4 | 49100 |
| Example 51 | Co | 0.010 | — | 0.000 | Amorphous Phase | 1.63 | 2.5 | 48800 |
| Example 52 | Co | 0.100 | — | 0.000 | Amorphous phase | 1.66 | 2.7 | 48000 |
| Example 53 | Co | 0.400 | — | 0.000 | Amorphous phase | 1.70 | 2.9 | 47600 |
| Example 54 | Ni | 0.010 | — | 0.000 | Amorphous Phase | 1.60 | 2.2 | 49300 |
| Example 55 | Ni | 0.100 | — | 0.000 | Amorphous Phase | 1.58 | 2.0 | 49900 |
| Example 56 | Ni | 0.400 | — | 0.000 | Amorphous Phase | 1.51 | 1.6 | 50200 |
| Example 57 | — | 0.000 | Al | 0.030 | Amorphous Phase | 1.60 | 2.4 | 48900 |
| Example 58 | — | 0.000 | Mn | 0.030 | Amorphous Phase | 1.59 | 2.5 | 48700 |
| Example 59 | — | 0.000 | Zn | 0.030 | Amorphous phase | 1.61 | 2.3 | 49100 |
| Example 60 | — | 0.000 | Sn | 0.030 | Amorphous phase | 1.60 | 2.2 | 49000 |
| Example 61 | — | 0.000 | Bi | 0.030 | Amorphous Phase | 1.58 | 2.6 | 48300 |

TABLE 6-continued

| | Fe(1-(α + β))X1αX2β (a to e are sane as Example 1) | | | | | | | |
|---|---|---|---|---|---|---|---|---|
| | X1 | | X2 | | | Bs | Hc | |
| Sample No. | Type | α{1-(a + b + c + d + e)} | Type | β{1-(a + b + c + d + e)} | XRD | (T) | (A/m) | μ' (1 kHz) |
| Example 62 | — | 0.000 | Y | 0.030 | Amorphous Phase | 1.59 | 2.5 | 48600 |
| Example 63 | Co | 0.100 | Al | 0.030 | Amorphous phase | 1.62 | 2.5 | 48200 |

TABLE 7

| | a to e, α, β are same as Example 1 | | | | | | | |
|---|---|---|---|---|---|---|---|---|
| Sample No. | Rotational speed of roll (m/sec) | Heat treatment temperature (° C.) | Average grain size of initial fine crystal (nm) | Average grain size of Fe-based nanocrystal alloy (nm) | XRD | Bs (T) | Hc (A/m) | μ' (1 kHz) |
| Example 71 | 55 | 400 | No initial fine crystal | 3 | Amorphous phase | 1.55 | 2.9 | 45200 |
| Example 72 | 50 | 380 | 0.1 | 3 | Amorphous phase | 1.55 | 2.9 | 45900 |
| Example 73 | 40 | 400 | 0.3 | 5 | Amorphous phase | 1.56 | 2.7 | 47300 |
| Example 74 | 40 | 425 | 0.3 | 10 | Amorphous phase | 1.59 | 2.4 | 49300 |
| Example 1 | 40 | 450 | 0.3 | 15 | Amorphous phase | 1.61 | 2.4 | 49100 |
| Example 75 | 30 | 450 | 10.0 | 20 | Amorphous phase | 1.61 | 2.5 | 48800 |
| Example 76 | 30 | 475 | 10.0 | 30 | Amorphous phase | 1.62 | 2.8 | 46100 |
| Example 77 | 20 | 500 | 15.0 | 50 | Amorphous phase | 1.64 | 3.0 | 44600 |

Table 1 shows Examples and Comparative examples in which mainly B content (a) was changed.

Examples 1 to 7 in which B content (a) was within a range of $0.090 \le a \le 0.240$ had good saturation magnetic flux density, coercive force, and permeability μ'. On the other hand, Comparative example 1 having a=0.250 had a thin ribbon before the heat treatment made of crystal phases, the saturation magnetic flux density after the heat treatment decreased, the coercive force after the heat treatment significantly increased, and the permeability μ' after the heat treatment decreased significantly. Comparative example 2 having a=0.080 had a thin ribbon before the heat treatment made of crystal phases; and the coercive force after the heat treatment increased significantly and the permeability μ' after the heat treatment decreased significantly.

Table 2 shows Examples and Comparative examples in which Si content (b) was varied.

Examples 11 to 14 in which Si content (b) was within a range of $0.030 < b < 0.080$ had good saturation magnetic flux density, coercive force, and permeability μ'. On the other hand, Comparative example 3 having b=0.080 had decreased saturation magnetic flux density. Comparative example 4 having b=0.030 had an increased coercive force and a decreased permeability μ'.

Table 3 shows Examples and Comparative examples in which C content (c) was varied. Also, Comparative example which did not include C and Cu are also shown (Comparative example 7).

Examples 21 to 24 which satisfied $0 < c < 0.040$ had good saturation magnetic flux density, coercive force, and permeability μ'. On the other hand, Comparative example 5 having c=0.040 had an increased coercive force and a decreased permeability Comparative examples 6 and 7 which were c=0 had an increased coercive force and a decreased permeability W.

Table 4 shows Examples and Comparative examples in which Cu content (d) was varied. Also, Comparative example which did not include C and Cu are also shown (Comparative example 7).

Examples 31 to 34 satisfying $0 < d \le 0.020$ had good saturation magnetic flux density, coercive force, and permeability μ'. On the other hand, Comparative example 8 having d=0.022 had a thin ribbon before the heat treatment made of crystal phases, the coercive force after the heat treatment increased significantly, and the permeability μ' after the heat treatment decreased significantly. Comparative examples 7 and 9 which were d=0 had an increased coercive force and a decreased permeability μ'.

Table 5 shows Examples and Comparative examples in which type and content of M were varied.

Examples 41 to 49 satisfying $0 \le e \le 0.030$ had good saturation magnetic flux density, coercive force, and permeability μ'. On the other hand, Comparative example 10 having e=0.050 had a decreased saturation magnetic flux density.

Table 6 shows Examples in which part of Fe were substituted by X1 and/or X2.

Table 6 shows that good properties can be obtained even in case part of Fe were substituted by X1 and/or X2.

Table 7 shows Examples which changed an average grain size of the initial fine crystal and the average grain size of Fe-based nanocrystal alloy by changing a rotational speed of a roll and/or a heat treatment temperature of Example 1.

Table 7 shows that good properties can be obtained even when the average grain size of the initial fine crystal and the average grain size of Fe-based nanocrystal alloy were changed by changing the rotational speed of the roll and the heat treatment temperature.

What is claimed is:

1. A soft magnetic alloy having a composition represented by a compositional formula $Fe_{(1-(a+b+c+d+e))}B_aSi_bC_cCu_dM_e$, in which M is Nb, $0.090 \le a \le 0.240$, $0.050 \le b \le 0.070$, $0.001 \le c \le 0.038$, $0.001 \le d \le 0.020$, and $0.010 \le e \le 0.030$.

2. The soft magnetic alloy according to claim 1 comprising an amorphous and an initial fine crystal and the soft magnetic alloy has a nano-hetero structure in which the initial fine crystal is in the amorphous, and the initial fine crystal is a crystal having a grain size of 15 nm or less.

3. The soft magnetic alloy according to claim 2, wherein an average grain size of the initial fine crystal is 0.3 to 10 nm.

4. The soft magnetic alloy according to claim 1 having a structure made of a Fe-based nanocrystal.

5. The soft magnetic alloy according to claim 4, wherein an average grain size of the Fe-based nanocrystal is 5 to 30 nm.

6. The soft magnetic alloy according to claim 1 having a thin ribbon form, wherein the thin ribbon form is a ribbon form having a thickness of 5 to 30 μm.

7. The soft magnetic alloy according to claim 1 having a powder form.

8. A magnetic component comprising the soft magnetic alloy according to claim 1.

9. The soft magnetic alloy according to claim 1, wherein $0.120 \le a \le 0.220$.

10. The soft magnetic alloy according to claim 1, wherein $0.010 \le c < 0.030$.

11. The soft magnetic alloy according to claim 1, wherein $0.005 \le d \le 0.015$.

12. The soft magnetic alloy according to claim 1, wherein $0.700 \le 1-(a+b+c+d+e) \le 0.800$.

* * * * *